United States Patent

Ouska

[15] 3,690,445
[45] Sept. 12, 1972

[54] APRON CONVEYOR
[72] Inventor: Ralph C. Ouska, Hinsdale, Ill.
[73] Assignee: FMC Corporation, San Jose, Calif.
[22] Filed: May 18, 1971
[21] Appl. No.: 144,508

[52] U.S. Cl. .................................. 198/196
[51] Int. Cl. ............................. B65g 15/30
[58] Field of Search .............. 198/195, 196, 189

[56] References Cited

UNITED STATES PATENTS 2,950,000    8/1960    Rivers ...................... 198/196

Primary Examiner—Edward A. Sroka
Attorney—F. W. Anderson and C. E. Tripp

[57] ABSTRACT

A conveyor having a plurality of juxtaposed apron pans pivotally interconnected by piano hinges which facilitate independent replacement of individual apron pans.

18 Claims, 4 Drawing Figures

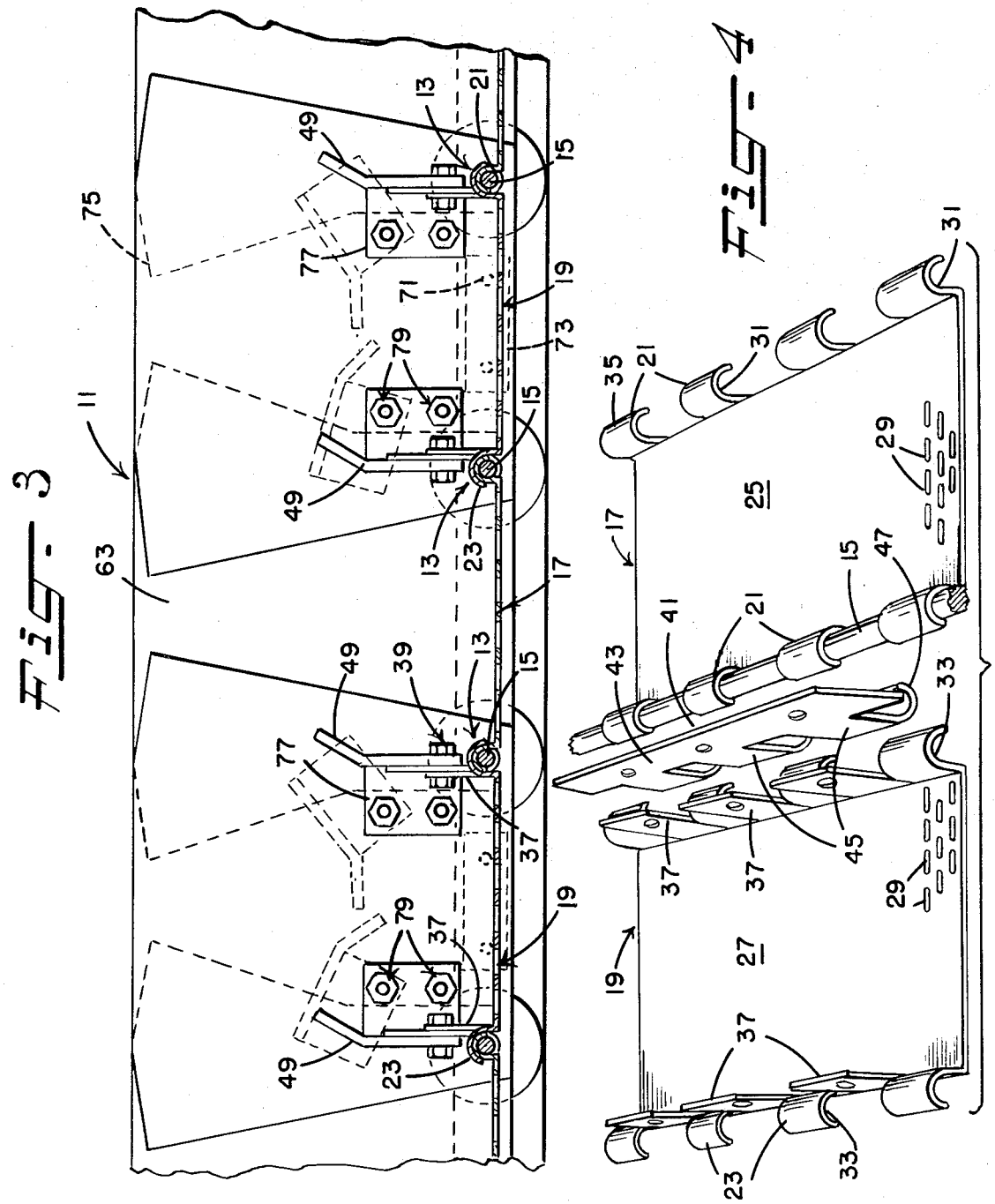

APRON CONVEYOR

The present invention is directed to apron pan conveyors.

Apron pan conveyors consist of a plurality of juxtaposed pans articulated with respect to each other to permit conveyor travel along an endless path. The material to be conveyed is carried by the apron pans which may themselves be and/or may require that other elements of the conveyor be of heavy and/or bulky construction to impart sufficient rigidity to the conveyor in its transverse direction. Of course, the heavier the conveyor, the greater are the drive power requirements and more massive is the conveyor supporting structure. On the other hand, an increase in the bulk of the conveyor generally involves a reduction in its load-carrying capacity and, frequently, complicates the replacement of apron pans which have worn or have been damaged, as by bending, tearing, or where heater conditions are involved, warping or burning. WIth known apron pan conveyors, pan replacement is an already difficult, time-consuming and expensive task, usually involving extensive disassembly of the conveyor. Accordingly, a primary object of this invention is to provide a new or generally improved and more satisfactory apron pan conveyor.

Another object of this invention is the provision of an apron pan conveyor in which the pans are interconnected by piano hinges which facilitate replacement of individual apron pans with a minimum of conveyor disassembly and without loss of conveyor integrity.

Still another object of this invention is to provide a conveyor having a belt of apron pans which are articulated to each other by piano hinges which are compact, snug and rapidly and easily disassembled.

A further object of this invention is to provide apron pan conveyors which are of lighter weight than known apron pan conveyors of corresponding width, yet which possess desired rigidity in their transverse directions.

A still further object of this invention is the provision of an improved apron conveyor which has a large load-carrying capacity, yet is light in weight, and in which apron pans, may be replaced rapidly even in confined working areas and, in instances while the conveyor itself is in motion.

These and other objects are accomplished in accordance with the present invention by a conveyor having an apron conveyor belt comprised of a plurality of apron pans in juxtaposed relationship and articulated to each other by piano hinges. The piano hinges are of like construction with each including a hinge rod positioned between each of the juxtaposed pans and hinge corrugations at spaced intervals along the opposite sides of each of the apron pans. The hinge corrugations of alternate of the juxtaposed apron pans, referred to as suspended pans, pivotally engage with the hinge rods, and are overlapped by the corrugations of adjacent apron pans, referred to as retainer pans. Lock bars are positioned between the juxtaposed pans and include fingers arranged in interdigitating relationship with the spaced corrugations on such pans. At the free ends of each of the fingers is formed a hinge corrugation which opens in a direction opposite to the corrugations of the juxtaposed pans and which pivotally engages the hinge rod positioned between such pans.

The respective lock bars are secured by removable fasteners to the retainer apron pans and, more particularly, to flanges on such pans which project in between and in the same direction as the hinge corrugations thereof.

Each individual apron pan may span across the entire width of the conveyor belt. In the preferred embodiment of the present invention a series of apron pans are pivotally supported between each pair of adjacent hinge rods, with the pans of each respective series of pans being of like construction. With this latter arrangement, localized apron pan wear or damage involves the replacement of pans which are relatively short in length and which are, therefore, less costly and more easily handled than the cumbersome pans often employed in known apron pan conveyors.

The lock bars are of a length substantially equal to that of the respective apron pans and, in the preferred embodiment, the individual lock bars may be coextensive with the respective series of pans so as to impart greater rigidity to the conveyor belt in its transverse direction. A stiffener bar, which extends across the entire width of the conveyor belt may be releasably attached to the lock bars at selected or at each of the piano hinges to impart still greater transverse rigidity to the conveyor belt.

If necessary for containing the conveyor load, side plates may be provided at the opposite ends of each series of pans, Preferably the lock bars, or stiffener bars if used, are secured at their ends to certain of such side plates by removal fasteners to enhance the transverse rigidity of the conveyor, yet permit the limited conveyor disassembly which is necessary for apron pan replacement.

Preferably, the apron conveyor belt is advanced by a pair of laterally spaced chain link strands which are supported for movement along an endless path having a load-carrying run and a return run, with suitable means being provided for driving such strands at a desired rate of speed. More particularly, the hinge rods extend between the chain strands and serve as pivot pins for the overlapping links of the respective strands. Alternate of the chain links, referred to herein as plate links, of each chain strand may be of substantial height so as to serve as side plates for certain of the series of apron pans. The remaining of the chain links may be conventional bar links to which suitable sideplates may be attached.

Replacement of a retainer pan is achieved by releasing the opposite sides thereof from the respective lock bars. If the conveyor includes stiffener bars and side plates, such bars are released at least to such an extent 13 to permit the same to be moved away from the respective adjacent lock bars. These lock bars may be pivoted away from each other, if necessary, after which the worn of damaged apron pan is removed and replaced. The lock bars, and stiffener bars if used, are then returned to their normal position and refastened in place.

When replacing a worn or damaged suspended pan, the lockbars and, if present, the stiffener bars along opposite sides of such pans are released as described above. Since the corrugations of such suspended pan are overlapped at opposite sides thereof by the corrugations of the adjacent retainer pans, the sides of such adjacent retainer pans which are remote from the suspended pan which is to be replaced are loosened and preferably released from their respective lock bars. This last step facilitates movement of the sides of the retainer pans which are nearest to the worn or damaged suspended pan and thus permits removal and replacement of such suspended pan. Once pan replacement is completed, the different lock and stiffener bars are returned to their normal positions and resecured.

THe apron pans and lock bars are formed of materials of substantially like thickness. Except where extremely heavy loads are to be encountered the apron pans and lock bars may be fabricated from light gauge metal sheets, as by stamping followed by corrguating with suitably shaped dies.

The apron conveyor of the present invention is adapted for used in a variety of applications and with different materials. In view of the snug, yet compact piano hinges, the conveyor described may be employed with granular or fine materials, and is eminently suited for operation under high temperature conditions, as for example in the manufacture of coke products.

In the drawing, FIG. 1 is a diagrammatic side view of the apron conveyor of the present invention;

FIG. 3 is a vertical section taken generally along the line III— III of FIG. 1; and FIG. 4 is an expanded perspective view of a hinge of the conveyor of the present invention.

Figure 1:
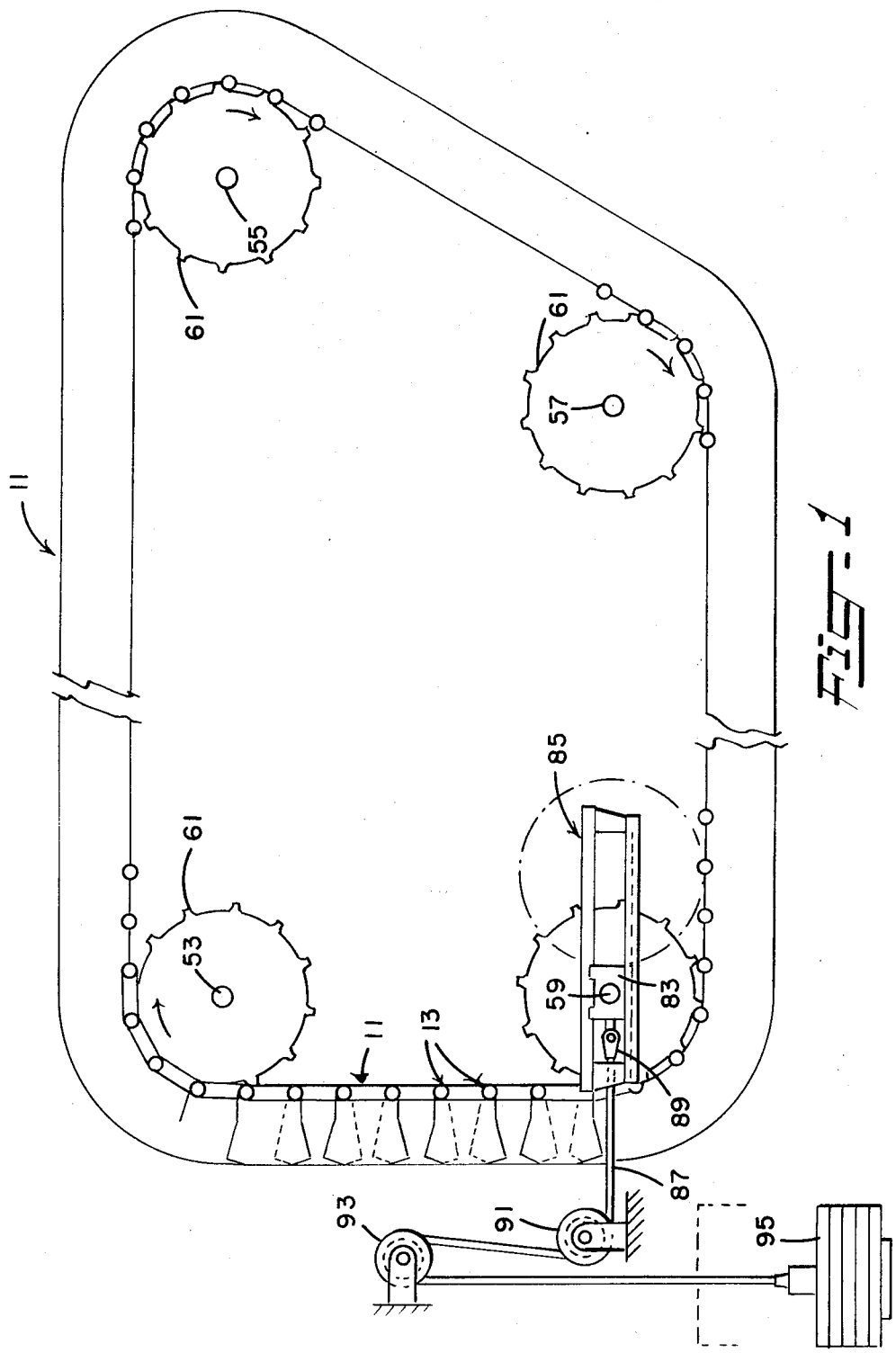

With reference to the drawing, the conveyor of the present invention illustrated is indicated by the character 11 and includes a belt comprised of a plurality of apron pans in juxtaposed relationship and articulated to each other by piano hinges indicated at 13. The piano hinges 13 are of like construction, with each including a hinge or cross rod 15, which is positioned between adjacent juxtaposed apron pans 17 and 19 and extends across the entire width of the apron belt, and hinge corrugations or curled beads 21 and 23 at spaced intervals along the opposite sides of respective apron pans.

More particularly, the apron pans 17 and 19 include load-carrying surfaces 25 and 27 which, in the embodiment illustrated, are flat or planar and are formed with staggered rows of equally spaced perforations 29. The spaced hinge corrugations 21 provided along the opposite sides of the apron pans 17 project beyond the load-carrying surfaces 25 thereof the engage directly with the hinge rods 15. The inside surfaces 31 of the corrugations 21 mate with the peripheries of the hinge rods 15 so as to permit free articulation of the pans 17 relative to such hinge rods. Each of such arcuate surfaces 31 extend through an angle which is greater than 90° and preferably no greater than 180° to insure adequate support of the pans 17, yet enable such pans to be easily assembled onto and removed from the hinge rods 15 when it is so desired.

The corrugations 23 provided along the opposite sides of the apron pans 19 also project from the load-carrying surfaces 27 thereof and are substantially of the same length and spacing as the corrugations 21 of the apron pans 17. While the apron pans 17 are suspended between adjacent hinge rods 15, the corrugations 23 of the pans 19 engage over the corrugations 21 of the pans 17 and serve to retain the suspended pans 17 in place. Thus, the inside arcuate surfaces 33 of the corrugation 23 of the pans 19 mate with the outside arcuate surfaces 35 of the corrugations 21 of the pans 17 so as to permit free articulation of these adjacent pans 17 and 19 relative to each other. As with the corrugations 21 of the apron pans 17, the corrugations 23 of the pans 19 extend through an angle of at least 90° and not more than 180° to insure proper support of the pans 19 and facilitate easy installation and removal thereof.

In addition to the above difference, the apron pans 19 are distinguished from the pans 17 by the presence of flanges 37 which project from their load-carrying surfaces 27 and extend inbetween the corrugations 23 thereof. The flanges 37 along the respective opposite sides of the apron pans 19 are secured by removable fasteners, indicated at 39, to individual lock bars 41. The lock bars 41 are of like construction, with each including a continuous web 43 having a length substantially equal to that of the apron pans, and spaced fingers 45 which project from such web 43 and are arranged in interdigitating relationship with the pan corrugations. At their free ends the lock bar fingers 45 are each formed with hinge corrugation or curled bead 47 which project from such web opens in a direction direction opposite to the corrugations of the juxtaposed pans 17 and 19, and which mates and pivotally engages with the hinge rod 15 positioned between such juxtaposed pans.

The piano hinges 13 of the conveyor belt are compact so that apron pans themselves have a large load-carrying capacity. Also, these piano hinges are rather snug, thus minimizing leakage, as when granular materials are being transported, yet are open sufficiently to insure proper discharge of materials therefrom and to permit circuitous passage of gases therethrough. Of still further significance is that expansion experienced by the different elements of the piano hinges 13 as for example during high temperature operating conditions, do not inhibit the free articulating movement of the apron pans or lock bars, nor involve any sacrifice in the integrity of such hinges.

Figure 2:
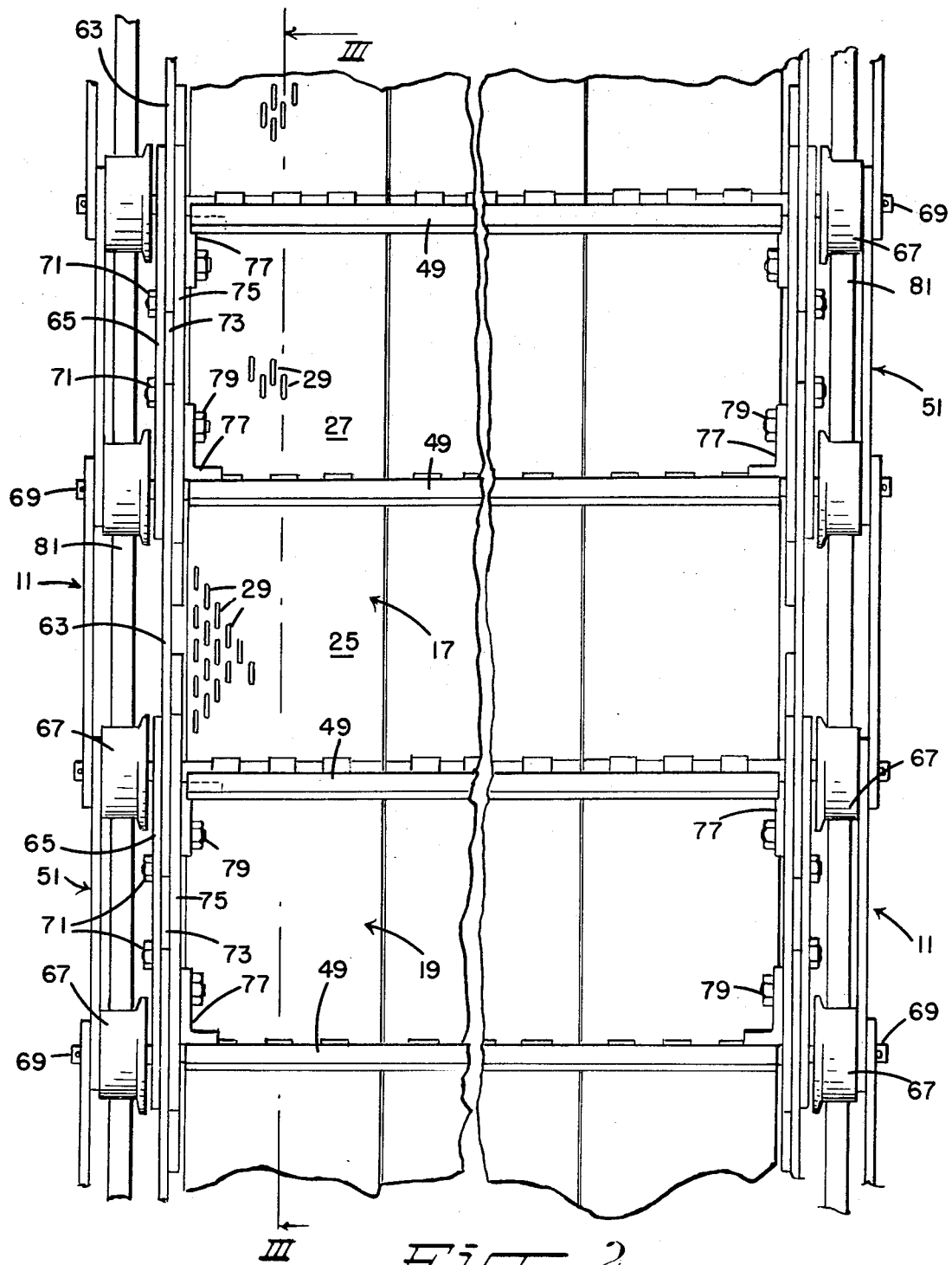
FIG. 2 is a plan view of a portion of the conveyor shown in FIG. 1.

As shown in FIG. 2, in lieu of having each of the individual apron pans 17 and 19 span across the entire width of the conveyor belt, a series of such pans may be pivotally supported between each pair of adjacent hinge rods 15, with the pans of each respective series being of like construction.

The webs 43 of the respective lock bars 41 may have a length substantially equal to that of the individual pans or may extend across the entire width of the conveyor belt. Added transverse rigidity may be and preferably is provided to the conveyor belt by attaching a stiffener bar 49, which extends across the entire width of the conveyor belt, to the lock bar webs 43, as by the removable fasteners 39. The stiffener bars 49 are substantially thicker than the lock bar webs 43 and are angled at their free ends to insure proper discharge of materials from the conveyor belt and to enhance the rigidity thereof.

In the specific embodiment illustrated, the conveyor belt is advanced by a pair of like, laterally spaced endless chain link strands 51 which are supported by shafts 53, 55, 57, and 59 and engaged by sprockets 61 carried thereon. More specifically, the hinge rods 15 extend between the respective chain strands 51 and serve as pivot pins for overlapping chain links 63 and 65 and flanged, bushed rollers 67 which are retained thereon as by cotter pins 69.

The alternate chain links 63 of the innermost series of links of the respective chain strands 51 are hereafter referred to as plate links, while the remaining links of such strands 51 are conventional bar links. The plate links 63 are of a height substantially greater than that of the links 65 which are adjacent thereto and serve as side plates for the respective series of apron pans 17. By means of fasteners 71 and filler bars 73, plates 75 are fixed to the links 65 which are adjacent to the plate links 63 and serve as side plates for the respective series of apron pans 19. As illustrated in FIG. 3, the substantial overlap exists between the plate links 63 and plates 75 to ensure proper containment of the material within each series of apron pans as they enter and leave the load-carrying run of the conveyor which extends between the shafts 53 and 55.

For the sake of still greater rigidity clip angles 77 are fixed, as by welding, to the opposite ends of the stiffener bars 49 and are secured to the side plates 75 by removable fasteners, as indicated at 79.

The conveyor 11 is advanced at a desired rate of speed by a driving force applied to one of the shafts 53, 55, 57 and 59 from a suitable variable speed motor, coupled with a speed reducer, not shown. As in conventional conveyors, fixed rails 81 are provided for supporting the flanged chain strand rollers 67 as the conveyor 11 is advanced along its load-carrying run.

To accommodate for variations in length which the conveyor 11 may experience during different operating conditions, as when the conveyor is cooled after operating in a heated atmosphere, the opposite ends of the shaft 59 are rotatably supported by bearing blocks 83, which in turn are slidably supported by stationary guides 85. A separate cable 87 is attached at 89 to the respective bearing blocks 83, laced over pulleys 91 and 93 and carries a plurality of weights 95 at its free end. Thus, as the conveyor 11 is heated and increases in length, the weights 95 cause the respective bearing blocks 83 to move to the left, as viewed in FIG. 1, along the guides 85. The shaft 59 will, of course, move with the bearing blocks 83 so that the conveyor is maintained taut and with sprockets 61 carried by the shaft 59 engaged at all times with the chain strands 51. During subsequent cooling of the conveyor 11, as the contracting forces which are developed therein exceed the forces exerted by the weights 95, the bearing blocks 83 and the shaft 59 carried thereby move to the right along the guides 85 and thus prevent damage or rupture of the conveyor itself or distortion of its supporting shafts.

In view of the short lengths of the apron pans 17 and 19, as compared to the width of the conveyor itself, replacement of worn or damaged apron pans is a rather simple operation which can be effected rapidly, even in confined working areas. For example when it is desired to replace one or more retainer pans 19 in a certain series of such pans, the flanges 37 of all of the pans 19 of such series of pans are first released from the lock bars 41 adjacent thereto by removing the connecting fasteners 39. Removal of such fasteners 39 also releases the stiffener bars 49 which were attached to these adjacent lock bars 41. The lowermost of each pair of fasteners 79 passing through the clip angles 77 fixed to the opposite ends of these particular stiffener 49 are clip angles then removed, afterwhich such stiffener bars 49 and the clip angles 77 attached thereto are pivoted into position as shown in broken lines in FIG. 3. Desirably, the freed lock bars 41 are pivoted onto the adjacent suspended pans 17. The pan 19 which is to be replaced is then simply lifted away. After a new pan 19 has been positioned, the lock bars 41 and the stiffener bars 49 are returned to their original positions and resecured in place.

Replacement of a worn or damaged pan 17 of any one series of such pans requires that, in addition to the above-described steps, the series of pans 19 on either side of the pan 17 which is to be replaced be released for at least limited movement. More particularly, the sides of such series of pans 19 which are remote from the worn or damaged pan 17 are loosened and preferably released, in a manner as heretofore described, from the lock bars 41 which are adjacent thereto. When this has been accomplished, the sides of such pans 19 which are nearest to the pans 17 which is to be removed may be lifted freely so as to permit the desired pan replacement.

In view of the transverse rigidity imparted to the conveyor 11 by the hinge rods 15, lock bars 41 and stiffener bars 49, the apron pans themselves may be made from light gauge sheet steel which, of course, offers great economies in fabrication as well as conveyor operation. To provide for snug and freely articulating piano hinges 13, the apron pans and the lock bars are of like thickness and, for simplicity, are formed of like materials. The remaining elements of the conveyor belt, as for example the hinge rods 15 and stiffener bars 49, are of simple design and can be readily formed from commercially available materials.

It is to be understood that changes and variations may be made without departing from the spirit and scope of the invention as defined in the appended claims.

I claim:

1. In a conveyor, an apron conveyor belt comprising a plurality of conveyor apron pans in juxtaposed relationship, a hinge rod positioned between each of the juxtaposed pans, hinge corrugations at spaced intervals along the opposite sides of each of said pans with the corrugations of alternate of said pans pivotally engaging the hinge rods and being overlapped by the corrugations of the pans adjacent thereto, lock bars positioned between juxtaposed pans and including fingers arranged in interdigitating relationship with the spaced corrugations of such pans, each of said fingers having a hinge corrugation at its free end opening in a direction opposite to the corrugations of said juxtaposed pans and pivotally engaging the hinge rod positioned between such pans, and means securing the respective lock bars to said adjacent pans.

2. An apron conveyor belt as defined in claim 1 wherein a series of apron pans are pivotally supported between each pair of adjacent hinge rods with the pans of each respective series of pans being of like construction.

3. An apron conveyor belt as defined in claim 2 further including stiffener bars located between at least certain of said juxtaposed pans and secured to the lock bars thereat, each of said stiffener bars having a length substantially equal to the width of said conveyor belt.

4. An apron conveyor belt as defined in claim 2 further including side plates at the opposite ends of each series of pans.

5. An apron conveyor belt as defined in claim 1 wherein each of said adjacent pans includes flanges projecting inbetween and in the same direction as the hinge corrugations thereof, and wherein the respective lock bars are secured to the flanges of said adjacent pans.

6. An apron conveyor belt as defined in claim 5 wherein a series of apron pans are pivotally supported between each pair of adjacent hinge rods with the pans of each respective series of pans being of like construction, wherein each lock bar is substantially coextensive with each respective series of pans, and wherein the respective lock bars are secured to the flanges of said adjacent pans with removable fasteners to facilitate independent replacement of individual pans from each such series of pans.

7. An apron conveyor belt as defined in claim 6 further including a rigid stiffener bar extending substantially coextensive with each of the respective lock bars and being fixed thereto by said removable fasteners.

8. An apron conveyor belt as defined in claim 7 further including side plates connected to said hinge rods, and removable fasteners securing the opposite ends of said stiffener bars to the side plates at the opposite ends of said series of adjacent pans.

9. An apron conveyor comprising a pair of like laterally spaced chain strands including hinge rods extending between said pair of strands and links having overlapping end portions pivotally connected to said hinge rods, means supporting said chain strands for movement along an endless path having a load-carrying run and a return run, means including sprockets for driving said chain strands, an apron pan pivotally supported between each pair of adjacent hinge rods, hinge corrugations at spaced intervals along the opposite sides of each of said pans with the corrugations of alternate of said pans pivotally engaging the hinge rods and being overlapped by the corrugations of the pans adjacent thereto, lock bars positioned between juxtaposed pans and including fingers arranged in interdigitating relationship with the spaced corrugations of such pans, each of said finger shaving a hinge corrugation at the free end opening in a direction opposite to the corrugations of said juxtaposed pans and pivotally engaging the hinge rod positioned between such pans, and means for securing the respective lock bars to said adjacent pans.

10. An apron conveyor as defined in claim 9 wherein a series of apron pans are pivotally supported between each pair of hinge rods with the pans of the respective series of pans being of like construction.

11. An apron conveyor as defined in claim 10 further including stiffener bars located between at least certain of the series of juxtaposed pans and fixed to the lock bars thereat, each of said stiffener bars having a length substantially equal to that of said respective series of pans.

12. An apron conveyor as defined in claim 10 further including side plates at the opposite ends of each series of pans.

13. An apron conveyor as defined in claim 10 wherein said chain strands are roller chains in which the innermost over-lapping links thereof consist of bar links and plate links, said plate links being of substantially greater height than said bar 15 links and serving as side plates for said alternate pans, and plates each having a configuration corresponding with that of said chain plates supported from said bar links in overlapping relationship with said chain plates and serving as side plates for said adjacent pans.

14. An apron conveyor as defined in claim 13 including a rigid stiffener bar located between at least certain of the series of juxtaposed pans and fixed to the lock bars thereat, each of said stiffener bars having a length substantially equal to that of said respective series of pans, clip angles fixed to each of the opposite ends of the respective stiffener bars, and means for removably securing said clip angles to the side plates of said adjacent pans.

15. An apron conveyor as defined in claim 13 wherein each of said apron pans includes a flat load carrying surface, and further including perforations in the load-carrying surfaces of said pans, and wherein said means for supporting said chain strands includes fixed rails at least along the load-carrying run of said chain strands along which ride said rollers.

16. An apron conveyor as defined in claim 9 wherein each of said apron pans includes a load carrying surface, wherein the hinge corrugations along the respective pans project beyond the respective load carrying surfaces thereof, and wherein flanges integral with the respective load carrying surfaces project inbetween and in the same direction as the hinge corrugations thereof.

17. An apron conveyor as defined in claim 16 wherein a series of apron pans are pivotally supported between each pair of hinge rods with the pans of the respective series of pans being of like construction, wherein each lock bar is substantially coextensive with the respective series of pans and wherein the respective lock bars are secured to the flanges of said adjacent pans with removable fasteners to facilitate independent replacement of individual pans from each such series of pans.

18. An apron conveyor as defined in claim 17 further including a rigid stiffener bar substantially coextensive with each of the respective lock bars and fixed thereto by said removable fasteners.

* * * * *

UNITED STATES PATENT OFFICE
CERTIFICATE OF CORRECTION

Patent No. 3,690,445  Dated September 12, 1972

Inventor(s) Ralph C. Ouska

It is certified that error appears in the above-identified patent and that said Letters Patent are hereby corrected as shown below:

Col. 1, line 19, change "WIth" to --With--.
Col. 2, line 28  after "pans" delete the comma and insert a period;
Col. 2, line 53, delete "13";
Col. 2, line 56, change "of" to -- as -- .
Col. 3, line 8, change "THe" to --The--;
Col. 3, line 48, change "the" to --and--.
Col. 4, line 24, delete "project from such web";
Col. 4, line 24, delete "direction".
Col. 5, line 67, after "stiffener" insert --bars--.
Col. 6, line 1, delete "clip angles".
Col. 7, line 46, change "finger shaving" to --fingers having--.
Col. 8, line 13, delete "15".

Signed and sealed this 20th day of November 1973.

(SEAL)
Attest:

EDWARD M. FLETCHER, JR.
Attesting Officer

RENE D. TEGTMEYER
Acting Commissioner of Patents